United States Patent [19]

Kaczmarek et al.

[11] Patent Number: 4,983,297
[45] Date of Patent: Jan. 8, 1991

[54] WASTE WATER TREATING PROCESS SCHEME

[75] Inventors: Stanislaus A. Kaczmarek, Morris Plains; Piyush S. Shah, Succasunna; George A. Green, Elizabeth, all of N.J.

[73] Assignee: Exxon Research and Engineering Company, Florham Park, N.J.

[21] Appl. No.: 290,381

[22] Filed: Dec. 29, 1988

[51] Int. Cl.⁵ .................................................. C02F 3/30
[52] U.S. Cl. .................................. 210/605; 210/615; 210/631; 435/167
[58] Field of Search ............... 210/603, 605, 606, 609, 210/610, 611, 612, 613, 615, 616, 617, 631; 435/167; 48/197 A

[56] References Cited

U.S. PATENT DOCUMENTS

| | | | |
|---|---|---|---|
| 4,137,158 | 1/1979 | Ishida et al. | 210/605 |
| 4,315,823 | 2/1981 | Witt et al. | 210/615 |
| 4,351,729 | 9/1982 | Witt | 210/603 |
| 4,384,956 | 5/1983 | Mulder | 210/605 |
| 4,585,063 | 4/1986 | Venardos et al. | 210/631 |
| 4,597,872 | 7/1986 | Anderson et al. | 210/615 |
| 4,735,723 | 4/1988 | Mulder | 210/617 |

*Primary Examiner*—Peter Kratz
*Attorney, Agent, or Firm*—Roy J. Ott

[57] ABSTRACT

Waste water, such as water separated from crude oil at a production well which comprises an alkali metal component, a Group II A metal component, organic pollutants and insoluble oils and solids, is treated by the sequential steps of oils and solids removal, $H_2S$ removal, anaerobic treatment and aerobic treatment.

10 Claims, 1 Drawing Sheet

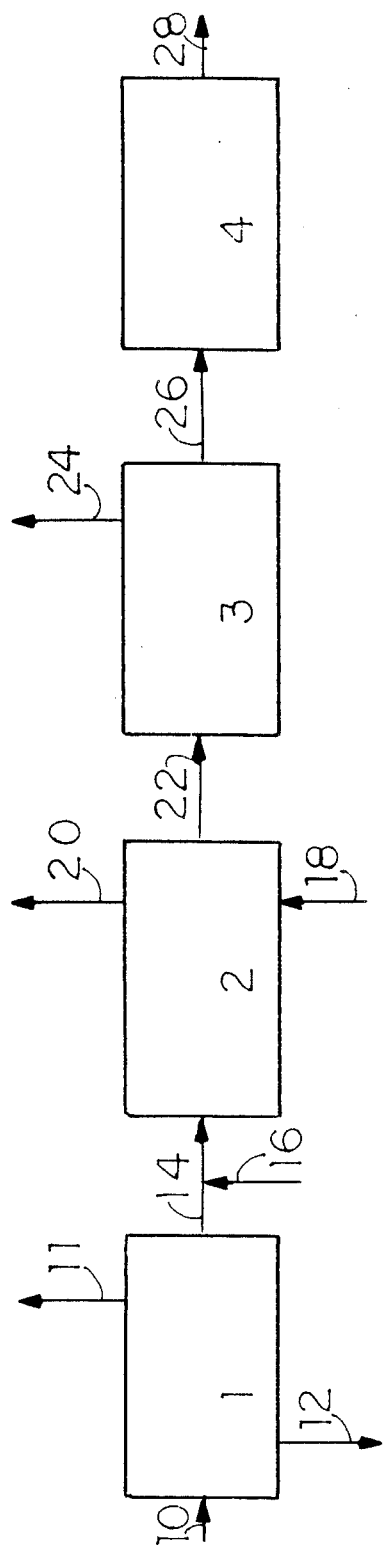

WASTE WATER TREATING PROCESS SCHEME

BACKGROUND OF THE INVENTION

1. Field of the Invention

This invention relates to a waste water treating process scheme including anaerobic and aerobic biological treatments.

2. Description of Information Disclosures

Process schemes for treatment of waste water are known.

U.S. Pat. No. 4,487,697 discloses treating waste water using a mechanical clarifier, an anaerobic treatment and an aerobic treatment.

U.S. Pat. No. 4,315,823 discloses treating waste water in an anaerobic filter to which an alkaline material is added followed by aerobic treatment.

U.S. Pat. No. 4,522,722 discloses anaerobic treatment and aerobic treatment of waste water.

U.S. Pat. Nos. 4,137,168; 4,290,884; and 4,384,956 disclose anaerobic and aerobic treatment of waste water.

It has been disclosed that sodium inhibits anaerobic microorganisms. See, for example, McCarthy and McKinney "Volatile Acid Toxicity in Anaerobic Digestion", *Journal of Water Pollution Control*, Fed. Vol. 33, No. 3, pages 223–232.

It has now been found that waste water comprising insoluble oil and solids, soluble organic pollutants, $H_2S$ and salts of alkali metals and Group II A metals, such as water separated from crude oil at a production well, may be treated to meet environmentally acceptable requirements by a specific sequence of processing steps including an anaerobic treatment.

SUMMARY OF THE INVENTION

In accordance with the invention there is provided, a process for treating waste water comprising oil and solids, organic pollutants, hydrogen sulfide, a Group II A metal component of the Periodic Table of Elements, and an alkali metal component, which comprises the steps of: (a) removing at least a portion of said oil and solids from said waste water to produce a departiculated waste water; (b) removing at least a portion of said hydrogen sulfide from the waste water resulting from step (a); (c) subjecting the waste water resulting from step (b) to an anaerobic biological treatment to convert at least a portion of said organic pollutants to methane and carbon dioxide; and (d) subjecting the waste water resulting from step (c) to an aerobic biological treatment to decrease the biological oxygen demand of said waste water.

The Periodic Table of Elements referred to herein is given in *Handbook of Chemistry and Physics* published by the Chemical Rubber Publishing Co., Cleveland, Ohio, 45 Edition, 1964.

BRIEF DESCRIPTION OF THE DRAWING

The FIGURE is a schematic flow plan of one embodiment of the invention.

DESCRIPTION OF THE PREFERRED EMBODIMENT

Referring to the FIGURE, a waste water stream is introduced by line 10 into an insoluble oil and solids removal zone 1. The waste water stream of line 10 comprises insoluble oils and solids, hydrogen sulfide or a hydrogen sulfide precursor, an alkali metal component, a Group II A metal component, and soluble organic pollutants, such as hydrocarbonaceous oils, greases, and organic acids. The insoluble oils comprise free oils. The term "free oil" is used herein to designate an oil that can be filtered from water by using a 0.45 micron filter. The waste water to be treated by the process of the invention, may comprise from about 100 to about 2000 milligrams per liter (mg/l) of insoluble oils and solids; from above 0 to about 0.5 weight percent of hydrogen sulfide or hydrogen sulfide precursor; at least about 7000 mg/l, typically at least 10,000 mg/l of an alkali metal component which may be present in a range from about 7000 to about 20,000 mg/l, calculated as elemental metal; and at least about 50 mg/l of a Group II A metal component, which may be present in a range from about 50 to about 2000 mg/l, calculated as elemental metal. The alkali metal component is usually present predominantly as sodium chloride with a minor amount of potassium chloride. The Group II A metal component is usually present as the chloride, carbonate or sulfate of calcium and/or magnesium. The organic pollutants in the waste water to be treated include compounds, such as hydrocarbons, organic acids, organic alcohols and mixtures thereof. The organic pollutants may be present in the waste water in an amount ranging from about 0.1 to about 2 wt.%, typically from about 4000 to about 10,000 mg/l. The waste water stream may be derived from any source, such as petroleum refining processes, petrochemical processes, food industry, etc. The process of the present invention is particularly suited to treat waste water derived by separating water from crude oil at a production well. Such water comprises a high concentration of salts generally present in sea water, such as sodium chloride, magnesium compounds, etc.; insoluble hydrocarbonaceous oil and greases, and other organic compounds, such as organic acids. The waste water separated from crude oil at the production well will be designated herein "produced water". The waste water of line 10 is subjected to departiculation by any conventional means to remove at least a portion of the insoluble oil and solids from the waste water stream. Preferably, the insoluble oil and solids removal is performed by utilizing commercially available plate separators followed by commercially available media filters. The insoluble oil and solids removal step is conducted for a time sufficient to remove at least a portion of the insoluble oil and solids from the waste water, preferably to produce a departiculated waste water comprising less than 50 mg/l insoluble oil and less than 50 mg/l solids. The separated oil and solids are removed by lines 11 and 12, respectively. The departiculated waste water (e.g., waste water having a decreased amount of insoluble oil and solids) is removed from the oil and solids removal zone 1 by line 14 and passed to a hydrogen sulfide removal zone 2. An acid is introduced into line 14 by line 16 to acidify the departiculated waste water stream prior to the hydrogen sulfide removal step. The hydrogen sulfide may be removed by any conventional means such as stripping with steam or natural gas. The acid added by line 16 to line 14 is added in an amount sufficient to maintain the pH of the water stream 14 at an acid pH ranging from about 3.5 to about 6, preferably from about 5 to about 6. Suitable acids for use in acidification includes strong inorganic acids such as, for example, hydrochloric acid, phosphoric acid, phosphorous acid and/or their thermally decomposable salts, e.g., ammonium salts of strong acids. The acidified waste water is introduced into stripping zone 2 into which a stripping gas is introduced by line 18. The stripping gas may be steam, natural gas or any other conventionally used stripping gas. Preferably, the stripping gas is a sweet natural gas. The stripping zone may be operated at a temperature ranging from about 100 degrees F. to about 300 degrees F. and a pressure ranging from about 5 to about 60 psig, preferably ranging from about 10 to about 40 psig. Alternatively, the hydrogen sulfide removal may be performed by vacuum flashing in the absence of a stripping gas. The hydrogen removal step is conducted for a time sufficient to remove at least a portion of the hydrogen sulfide from the waste water, preferably to produce a waste water comprising less than 50 mg/l $H_2S$ and a total sulfur content of less than 300 mg/l. The effluent comprising hydrogen sulfide is removed from zone 2 by line 20. The waste water from which at least a portion of hydrogen sulfide has been removed is passed by line 22 into anaerobic treatment zone 3 to contact an acclimated biomass of microorganisms and, thereby, convert at least a portion of the organic pollutants to methane and carbon dioxide. The biomass of anaerobic microorganisms (bacteria) is either acclimated before being introduced into zone 3 or it is acclimated in situ in zone 3. Anaerobic microorganisms for waste water treatment are commercially available, for example, from municipal sewage digesters.

The acclimatization is performed by contacting the biomass, in the absence of added oxygen, with water comprising organic pollutants, a Group II A metal component and a low concentration of an alkali metal component. Additional amounts of alkali metal component are introduced into the water stream to increase the concentration of the alkali metal component until it reaches the concentration of the water to be treated in a subsequent stage. Preferably, additional amounts of the Group II A metal component and the organic pollutants are also introduced incrementally with the added alkali metal component. Suitable alkali metal components are salts of sodium, potassium, lithium, cesium, rubidium and mixtures thereof, such as the chloride salts. Sodium and potassium components are preferred due to their cost, availability, and predominance in natural waters. Particularly preferred is sodium chloride. Suitable Group II A components are salts of magnesium, salts of calcium and mixtures thereof, such as salts present in sea water. Preferred Group II A metal components are magnesium chloride, calcium chloride and mixtures thereof. The biomass may also comprise a nutrient, such as acetic acid. The initial water stream in the acclimatization stage may comprise a concentration of alkali metal component ranging from about 500 to about 1000 mg/l, calculated as elemental metal, and from about 50 to about 100 mg/l of a Group II A component, calculated as elemental metal. Gradually, incremental amounts of alkali metal component are added at a rate of about 500 to 1000 mg/l per day. Preferably, additional amounts of Group II A metal components are also incrementally added when the incremental alkali metal component is being added. More preferably, organic pollutants are also incrementally added with the alkali metal component and with the Group II A metal component. The acclimatization may be conducted for time periods ranging from about 40 to about 80 days. Suitable temperature for the acclimatization stage may range from about 30 to about 40 degrees C., preferably from about 33 to about 37 degrees C. The pressures in the acclimatization zone is controlled by the gas collection apparatus and ranges typically from about 0 to about 5 psig. After the biomass of microorganisms has been acclimated to the alkali metal component and Group II A metal component to minimize the inhibiting effect (biocidal or biostatic) of high concentration of these compounds, the acclimated biomass is contacted with a waste water stream comprising organic pollutants, a Group II A metal component, and a high concentration of an alkali metal component. As stated previously, the biomass could have been acclimated prior to introducing it into the conversion zone or the biomass could be acclimated after being introduced into the conversion zone (i.e. in situ). In either embodiment, the acclimated biomass is contacted, in a conversion zone, with the waste water to be treated, in the absence of molecular oxygen, to convert at least a portion of the organic pollutants to carbon dioxide and methane. The waste water to be treated in the anaerobic zone of the process of the present invention comprises an alkali metal component and a Group II A metal component. The alkali metal component is present in the water to be treated in an amount of at least about 7000 mg/l, typically at least 10,000 mg/l, and may range from about 7000 to about 20,000 mg/l, calculated as elemental metal. The Group II A metal component is present in the water to be treated in an amount of at least about 50 mg/l, and may range from about 50 to about 2000 mg/l, calculated a elemental metal. The alkali metal component is usually present predominantly as sodium chloride with a minor amount of potassium chloride. The Group II A metal component is usually present as the chloride, carbonate or sulfate of calcium and/or magnesium. The organic pollutants in the waste water to be treated in the anaerobic zone include organic compounds such as hydrocarbons, organic acids, organic alcohols and mixtures thereof. The organic pollutants may be present in the waste water in an amount ranging from about 0.1 to about 2.0 wt.%. The gas produced in zone 3 is removed by line 24. The waste water effluent of anaerobic treatment zone 3 is passed by line 26 to an aerobic treatment zone 4. The pH of stream 26 is adjusted by the addition of acid or base to yield a pH ranging from about 7.0 to about 8.5 in stream 26. The waste water stream 26 is introduced into aerobic treatment zone 4. Any conventional aerobic waste water treatment method for decreasing the Biological Oxygen Demand (B.O.D.) level may be used. The waste water stream 26, after appropriate pH adjustment, is contacted with a biomass of aerobic microorganisms in the presence of a molecular oxygen-containing gas, which may be air or another oxygen-containing gas. Aeration or oxygenation may be carried out by any known method. Aerobic treatment zone 4 may comprise a clarifier. Alternatively, the effluent of aerobic zone 4 may be passed to a clarification zone (not shown). The effluent of aerobic zone 4 having a decreased Biological Oxygen Demand is removed by line 28 for further treatment, reuse, or discharge.

The following prophetic example (paper example) is presented to illustrate the invention.

EXAMPLE

Waste water (i.e., produced water) separated from crude petroleum oil at a production well is treated in the following sequence of steps.

The initial waste wster, such as stream 10 of the FIGURE, is introduced into plate separators to remove free oil and insoluble solids from the waste water. The resulting waste water effluent of the plate separators now contains only 50 mg/l free oil and 50 mg/l insoluble solids. The waste water effluent of the plate separators is passed through a media filter to remove an additional amount of free oil and insoluble solids from the waste water. The waste water effluent stream removed from the media filter now contains only 10 mg/l free oil and 10 mg/l insoluble solids (this stream corresponds to stream 14 of the FIGURE). After the free oil and solids removal stage, the departiculated waste water is acidified by the addition of hydrochloric acid to a pH of 5.7 at 77° F. The acidified waste water is passed to a hydrogen sulfide stripper operated at a temperature of 150 degrees F. and a pressure of 55 psia. The acidified water is contacted with a sweet natural gas as stripping gas. The operating conditions are summarized in Table I.

TABLE I

| Stream | Stream 14[2] | Stripping Gas | Acid[1] (HCl) | Stream 22 (Stripped water) |
|---|---|---|---|---|
| Conditions | | | | |
| Temperature, °F. | 150 | 110 | — | 149 |
| Pressure, psia | 55 | 61 | — | 61 |
| Stream Rates | | | | |
| lb/hr | 399598 | 2032[2] | 424[2] | 399,443 |
| GPM at 60° F. | 801 | — | — | 801 |
| kSCFD | — | 911 | — | — |
| moles/hr. | 21684 | 100 | — | 21670 |

[1]100% HCl assumed
[2]stream 14 before the addition of acid
[3]pH of acidified stream 14 water is 5.7 at 77° F.

The stripped waste water is subjected to anaerobic biological treatment in an anaerobic reactor containing a biomass of anaerobic microorganisms. The anaerobic reactor is seeded with a 50:50 mixture of tap water and anaerobic digester contents from a municipal sewerage treatment plant. The initial feed consist of 5% produced water in 0.4% solution of acetic acid in tap water. The percentage of produced water is gradually increased to 100% over an 8 week period. After the acclimation period, the waste water corresponding to stream 22 of the FIGURE is introduced into the anaerobic reactor to contact the biomass of microorganisms. The temperature of the anaerobic zone is maintained at about 25° to 30° C. at atmospheric pressure. The pH of the anaerobic zone is maintained between 7.2 to 7.8. The operating conditions of the reaction zone, are summarized in Table II.

TABLE II

| Operating Parameters | |
|---|---|
| Hydraulic Retention (HRT), days | 1 |
| Loading, Kg COD/m³/d | 5 |
| Hydraulic Mode | Plug flow (upflow) |
| Packing | ⅜ in. plastic flexi-rings |
| Temperature, °C. | 25–30 |
| pH | 7.2–7.8 |
| Methane Generation, L/d | 2.4 |
| Methane concentration in gas, % | 78–87 |
| Organic removal based on methane generation, % | 50 |

The waste water effluent of the anaerobic treatment (line 26 of the FIGURE) is passed to an aerobic biological treatment zone. The operating conditions of the aerobic treatment zone are summarized in Table III. Depending on the type of system used, a clarifier to settle the biological sludge may be included in the aerobic biological treatment zone.

TABLE III

| Operating Parameters | |
|---|---|
| Feed | Anaerobic Effluent (waste water) |
| Operating mode | Attached growth |
| Hydraulic Retention, days | 1 |

The characteristics of the various streams which correspond to the streams in the FIGURE are shown in Table IV.

TABLE IV

| Constituents[1] | Stream 10 | Stream 14 | Stream 22 | Stream 26 | Stream 28 |
|---|---|---|---|---|---|
| Free Oil & Grease | 250 | 10 | 10 | <10 | <5[3] |
| Insoluble Solids | 250 | 10 | 10 | 200–1000 | <80[3] |
| Group II A Metals[2] | 250 | 250 | 250 | 250 | 250 |
| Alkali Metals[2] | 15000 | 15000 | 15000 | 15000 | 15000 |
| Total Dissolved Solids | 35000 | 35000 | 35000 | 35000 | 35000 |
| Soluble Oil & Grease | 150 | 150 | 150 | 50 | <15[3] |
| $H_2S$ | 400 | 400 | 50 | >50[3] | ND |
| $CO_2$ | 800 | 800 | 1 | — | — |
| $NH_3$—N | 145 | 145 | 145 | 45 | <1 |
| Biochemical Oxygen Demand (BOD) | 4000 | 4000 | 4000 | 1500[3] | <210[3] |
| Total Organic Carbon (TOC) | 2200 | 2200 | 2200 | 1000 | 140 |
| Organic Acids | 5100 | 5100 | 5100 | 2200 | <300[3] |
| pH at 77 degrees F. | 8.0 | 8.0 | 6.6 | 7.3–7.8 | 7.5–9.0 |

[1]All values mg/l except pH
[2]Calculated as elemental metal
[3]Estimated
ND = Not Detected

What is claimed is:

1. A process for treating waste water derived by separating water from crude oil at a crude oil production well, said waste water comprising insoluble oil, solids, organic pollutants, hydrogen sulfide, and alkali metal component in an amount of at least about 700 mg/l, calculated as elemental metal, and a Group IIA metal component of the Periodic Table of the Elements, which comprises the steps of:
    (a) removing at least a portion of said oil and solids from said waste water to produce a departiculated waste water;
    (b) removing at least a portion of said hydrogen sulfide from said waste water resulting from step (a);
    (c) subjecting the waste water resulting from step (b) to an anaerobic biological treatment to convert at least a portion of said organic pollutants to carbon dioxide and methane, wherein said waste water is contacted with an acclimated biomass of anaerobic microorganisms, said biomass being acclimated by the steps of: (i) contacting a biomass of anaerobic microorganisms, in the absence of molecular oxygen, with a water stream comprising organic pollutants, a Group IIA metal component of the Periodic Table of Elements and an alkali metal component; and (ii) incrementally adding an additional amount of said alkali metal component to said water of step (i) to acclimate said biomass of step (i); and (d) subjecting the waste water resulting from step (c) to an aerobic biological treatment to decrease the biological oxygen demand of said waste water.

2. The process of claim 1 wherein in step (a) said oil and solids are removed from said waste water by utilizing plate separators followed by media filters.

3. The process of claim 1 wherein said hydrogen sulfide is removed from said departiculated waste water by subjecting said departiculated waste water to stripping at an acid pH.

4. The process of claim 1, wherein in step (ii), an additional amount of said Group II A metal component and said ceramic pollutants are also added.

5. The process of claim 1, wherein said biomass is acclimated prior to being introduced into said waste water contacting zone.

6. The process of claim 1, wherein said biomass is acclimated in said waste water contacting zone.

7. The process of claim 1, wherein said water stream of step (i), comprises from about 500 to about 1000 mg/l of said alkali metal component, and from about 50 to about 100 mg/l of said Group II A metal component, each being calculated as elemental metal.

8. The process of claim 1, wherein, in step (d), the waste water resulting from step (c) is contacted with a biomass of aerobic microorganisms, in the presence of a molecular oxygen-containing gas, at a pH ranging from about 7.0 to about 8.5.

9. The process of claim 1, wherein said alkali metal component is present in said water in an amount of about 7000 to 20,000 mg/l, calculated as elemental metal.

10. The process of claim 1, wherein the acclimatization of steps (a) and (b) are conducted over a time period ranging from about 40 to about 80 days.

* * * * *